UNITED STATES PATENT OFFICE.

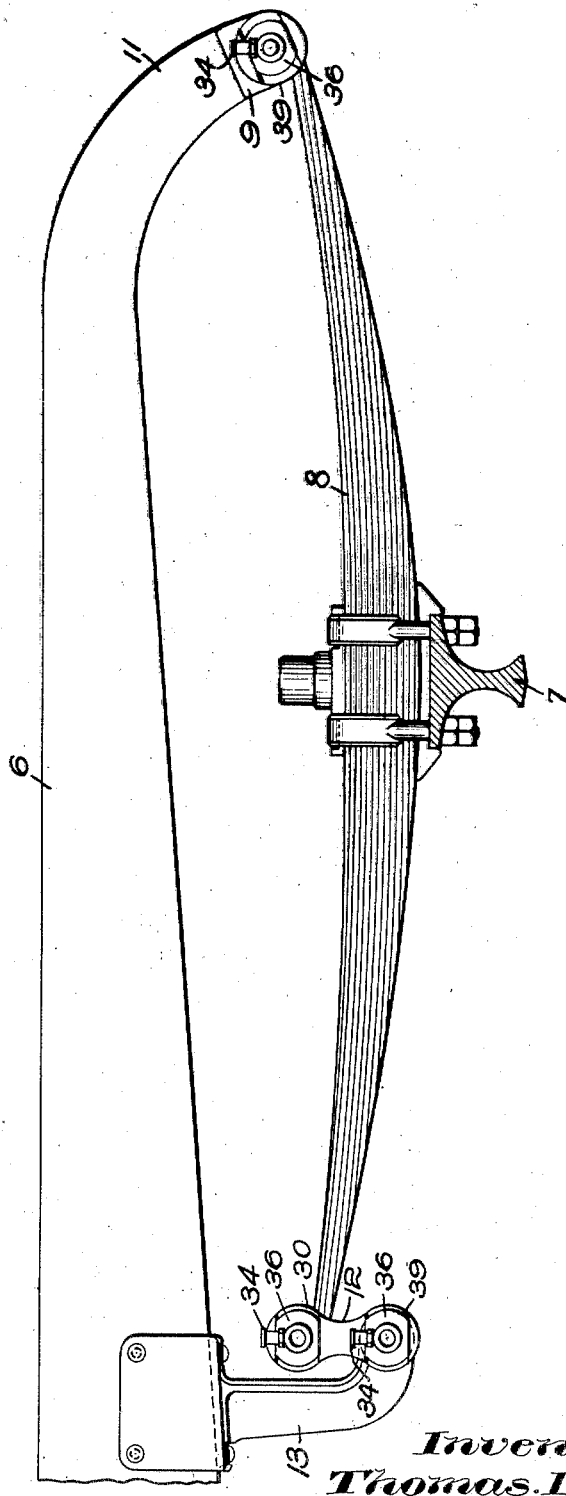

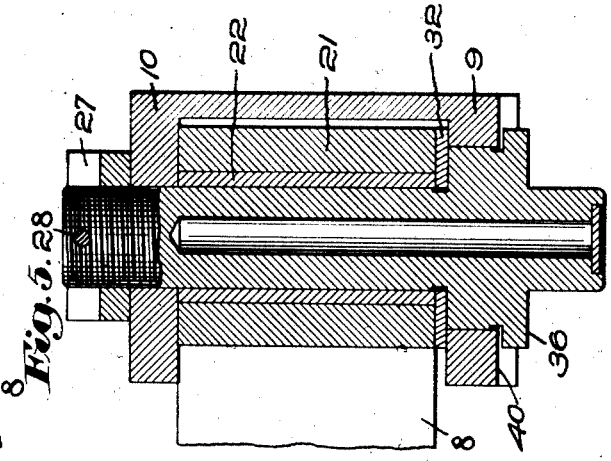

THOMAS L. COWLES, OF BRIDGEPORT, CONNECTICUT, ASSIGNOR, BY MESNE ASSIGNMENTS, TO THE LOCOMOBILE COMPANY, OF BRIDGEPORT, CONNECTICUT, A CORPORATION OF DELAWARE.

VEHICLE SPRING SUSPENSION.

1,372,120. Specification of Letters Patent. Patented Mar. 22, 1921.

Application filed August 16, 1918. Serial No. 250,139.

*To all whom it may concern:*

Be it known that I, THOMAS L. COWLES, a citizen of the United States, and resident of Bridgeport, county of Fairfield, State of Connecticut, have invented an improvement in Vehicle Spring Suspensions, of which the following description, in connection with the accompanying drawings, is a specification, like characters on the drawings representing like parts.

This invention relates to vehicle spring suspensions and is more particularly concerned with means for taking up axial play between the springs and shackles, between the shackles and frame and between the springs and frame, thereby to eliminate objectionable noises which are caused by looseness of these parts when wear unduly increases the clearances.

My invention will be best understood by reference to the following description when taken in connection with the accompanying drawings of one specific embodiment thereof, while its scope will be more particularly pointed out in the appended claims.

In the drawings:—

Figure 1 is a side elevation of a portion of a motor vehicle chassis having a spring suspension embodying my invention;

Fig. 2 is a side elevation on an enlarged scale, illustrating the spring shackle;

Fig. 3 is a sectional view on line 3—3 of Fig. 2;

Fig. 4 is a side elevation on an enlarged scale of the horn of the frame, the terminal portion of the spring, and the spring bolt; and Fig. 5 is a sectional view on line 5—5 of Fig. 4.

Fig. 6 is a plan of one of the spring bolts.

Referring to the drawings and to the embodiment of my invention which is illustrated therein, I have shown for purposes of exemplification the front portion of a motor vehicle having semi-elliptic springs, although it should be distinctly understood that my invention is susceptible of wide application to spring suspensions of various types. In the present embodiment of my invention the chassis frame comprises usual longitudinal members one of which is shown and designated 6, the same being supported on a usual axle 7 by a pair of semi-elliptic springs one of which is shown and designated 8. As is usually the case, the front end of the spring is received between two arms 9 and 10 of a horn 11, of common form, at the front end of the frame member 6. The rear end of the spring is connected to the frame member by a common form of shackle 12 which in the present embodiment of my invention is a bracket 13, the latter being secured to the frame member. In some types of construction the spring shackle is pivoted directly to the frame member instead of to a bracket, while in spring suspensions of the platform and three-quarters elliptic types the shackles connect two springs to each other. In full elliptic springs the upper and lower portions are usually directly connected to each other, although there are some, now practically obsolete, in which the upper and lower springs are shackled together. My invention is more particularly concerned with spring suspensions in which one of two pivotally connected members has a pair of rigidly connected arms embracing the other, such arms being always in definitely spaced relation with each other so that it is impossible to draw them together to take up axial play at the pivotal points.

Referring to Fig. 3, the shackle 12 in the present example is in the form of a letter H having a transverse portion 14 and two pairs of arms 15 and 16. The arms of one pair herein embrace a bearing 17 forming a part of the bracket 13, while the arms of the other pair embrace an eye 18 forming a part of the spring 8. The bearing 17 is herein provided with a usual bushing 19 and the eye 18 is similarly provided with a usual bushing 20. Likewise the arms 9 and 10 of the horn 11 embrace an eye 21 forming a part of the spring 8 and this eye is also provided with a usual bushing 22.

The three bushings form bearing sleeves for pivots which provide for turning movement of one part with relation to the other in a manner well known to those skilled in the art. These pivots may or may not be alike, but for convenience of manufacture and to reduce as far as possible the number of different parts they are preferably made alike. In the present embodiment I have provided pivots which are alike and for conveinence of description will designate each by the numeral 23.

It is customary to make these pivots in the form of bolts extending through the parts which they pivotally connect and in the present example I have shown each pivot provided with a head 24 and a threaded shank 25, the latter receiving a nut 26 which may be and herein is of the castellated type having a plurality of radial slots 27 to receive a cotter pin 28 by means of which the nut is held in the desired position of adjustment. Heretofore it has been customary to place the inner face of the bolt head against the outer face of the adjacent part through which the bolt extends. It is evident that under such circumstances it is impossible to take up axial play between the two pivotally connected parts owing to the fact that the arms of one are relatively immovable. It follows that as time goes on the wear which is bound to ensue in spite of careful lubrication will result in side play accompanied by disagreeable rattling sounds.

This problem, which has long baffled motor car engineers, I have solved by arranging the bolt head so that the latter acts either directly or indirectly against the end face of the part which is embraced by the arms. This is well illustrated, for example, in Figs. 3 and 5 in which it should be noted that the head 24 is freely movable axially in the arm through which it passes, said head having a shoulder 29 which may be adjusted axially by turning the nut 26. It should therefore be evident that any end play due to wear may be taken up from time to time, thus preserving the proper working clearance to permit lubrication of the bearing surface without undue looseness and noise. If desired, I may provide bearing washers 30, 31 and 32 to receive the thrust of the bolt heads, although this is not essential.

Spring bolts are usually provided with means for lubricating the bearing surfaces. In the case of some types of lubricating devices it is not a matter of any great consequence whether the bolt is left free to turn with relation to both parts, although in such case it is rather inconvenient to accomplish the adjustment because it then becomes necessary to hold the bolt against rotation by the aid of one wrench while the nut is rotated by means of another to take up end play. In other types of lubricating devices, such as that herein illustrated, it is important to prevent the bolt from turning, otherwise the supply of lubricating oil would escape and allow the bearing to run dry.

In the present embodiment I have shown the bolt provided with an axial chamber 33 forming an oil receiver receiving its supply from a common form of oil cup 34 and delivering the oil through one or more feed passages 35 to the bearing surfaces. In this case it is important to keep the oil cup 34 right side up, otherwise the oil would soon leak out of the reservoir. To this end I have herein provided the bolt with an enlarged head 36 having suitable provision to prevent turning movement, as for example by providing said head with flat faces 37 received between the corresponding shoulders of the part through which the head extends. One convenient way of providing these shoulders is to mill, plane or otherwise form shallow grooves to receive the heads 36 and to prevent them from turning. In the present example I have shown the link 12 provided with two such grooves designated 38 and 39 respectively and have provided the horn 11 with a similar groove designated 40, the depth of these grooves, however, being such as to permit a considerable adjustment to take up end play before the heads 36 bring up against the bottoms of the grooves. This is well illustrated in Fig. 5 wherein I have shown between the inner face of the head 36 and the bottom of the groove 40 a clearance space ample to permit adjustment from time to time to compensate for the wear accruing during many thousands of miles of use.

The interlocking of the bolt head with the part into which it extends has another advantage which should be evident from the foregoing, namely, since it prevents rotation of the bolt the adjustment for end play can be accomplished by simply removing the cotter pin 28 and turning the nut 26, without the necessity of applying a wrench to the bolt to hold the latter against rotation. The convenience of this will be readily appreciated when it is considered that some of these spring bolts are located in comparatively inaccessible places where it is difficult for one person to reach both ends of the bolt with his hands at one time.

Having thus described one embodiment of my invention, what I claim and desire by Letters Patent to secure is:—

1. In a spring suspension for vehicles, the combination of two pivotally connected members, one of which is provided with a pair of rigidly connected arms embracing the other, a pivot connecting said members, interlocking means to hold said pivot against turning movement with relation to one of said members while still permitting said pivot to be moved axially, screw-threaded means to move said pivot axially, and means carried by said pivot to urge one of said members axially with relation to the other to take up axial play.

2. In a spring suspension for vehicles, the combination of two pivotally connected members, one of which is provided with a pair of rigidly connected arms embracing the other, a bolt forming a pivot connecting said members and provided with a head operating axially against the embraced member, said head interengaging with and held against turning movement by the first member but axially slidable relatively thereto, and a nut threaded onto said bolt and operating against one of said arms to move said bolt axially.

3. In a spring suspension for vehicles, the combination of two pivotally connected members, one having a pair of rigidly connected arms embracing the other, a pivot connecting and mounted to slide axially in both of said members and interengaging with and held against turning movement by one, and means to cause axial movement of said pivot to take up axial play between said members.

4. In a spring suspension for vehicles, the combination of two pivotally connected members, one having a pair of rigidly connected arms embracing the other, a pivot connecting said members and interengaging with and held against turning movement by one, and means coöperating with said pivot to impart a relative axial movement to said members to take up axial play.

5. In a spring suspension for vehicles, the combination of two pivotally connected members, one having a pair of rigidly connected arms embracing the other, a pivot connecting said members and interengaging with and held against turning movement by one of said arms, and means coöperating with said pivot and the other arm to impart a relative axial movement to said members to take up axial play.

6. In a pivotal connection for vehicle springs, the combination of a bifurcated bearing and a bearing embraced thereby, both provided with alined apertures, a pivot received in the aperture of the embraced bearing and provided at one end with a head and at the other with a threaded shank, a nut threaded onto said shank, means interengaging with said head to hold the same against rotation while still permitting said pivot to be adjusted longitudinally, and an abutment abutting on the one hand against said head and on the other hand against said embraced member.

In testimony whereof, I have signed my name to this specification.

THOMAS L. COWLES.